(12) United States Patent
Lehtovirta

(10) Patent No.: US 8,611,210 B2
(45) Date of Patent: Dec. 17, 2013

(54) METHOD AND APPARATUS FOR RELIABLE BROADCAST/MULTICAST SERVICE

(75) Inventor: Vesa Lehtovirta, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 626 days.

(21) Appl. No.: 12/919,415

(22) PCT Filed: Feb. 26, 2008

(86) PCT No.: PCT/EP2008/052302
§ 371 (c)(1),
(2), (4) Date: Aug. 25, 2010

(87) PCT Pub. No.: WO2009/106131
PCT Pub. Date: Sep. 3, 2009

(65) Prior Publication Data
US 2011/0009094 A1 Jan. 13, 2011

(51) Int. Cl.
*G01R 31/08* (2006.01)

(52) U.S. Cl.
USPC .......................................... 370/228; 370/328

(58) Field of Classification Search
USPC ......... 370/216, 225–228, 340–341, 331, 389, 370/328; 455/410, 411, 432.1
See application file for complete search history.

(56) References Cited

U.S. PATENT DOCUMENTS

| | | | |
|---|---|---|---|
| 6,850,503 B2 * | 2/2005 | Dorenbosch et al. | 370/331 |
| 7,369,522 B1 * | 5/2008 | Soininen et al. | 370/328 |
| 8,125,888 B2 * | 2/2012 | Kandikonda et al. | 370/216 |
| 8,223,926 B2 * | 7/2012 | Luck et al. | 370/216 |
| 2003/0123423 A1 | 7/2003 | Okanoue | |
| 2003/0169704 A1 | 9/2003 | Okanoue | |
| 2004/0258021 A1 * | 12/2004 | Kashimoto et al. | 370/331 |

(Continued)

FOREIGN PATENT DOCUMENTS

| | | |
|---|---|---|
| JP | 2003174671 A | 6/2003 |
| JP | 2003259440 A | 9/2003 |
| WO | 99/48246 | 9/1999 |

OTHER PUBLICATIONS

European Telecommunications Standards Institute. ETSI TS 123 060, V7.6.0 (Jan. 2008). Digital cellular telecommunications system (Phase 2+); Universal Mobile Telecommunications System (UMTS); General Packet Radio Service (GPRS); Service description; Stage 2 (3GPP TS 23.060 version 7.6.0 Release 7).

(Continued)

*Primary Examiner* — Jeffrey M Rutkowski
(74) *Attorney, Agent, or Firm* — Coats & Bennett, P.L.L.C.

(57) ABSTRACT

A method is provided for use by a user terminal (20) operating an IP-based multimedia broadcast/multicast service. The method comprises storing (S3) information relating to user service registrations performed (S2) using an IP connection such as a Packet Data Protocol, PDP, context established to enable connectivity between the user terminal (20) and a service node (40) for the broadcast/multicast service. The information is of a type to enable re-registration (S7) of at least some of any of the user services affected by a loss of the IP connection. In one embodiment, the multimedia broadcast/multicast service is a 3GPP Multimedia Broadcast/Multicast Service, MBMS, the user terminal (20) is a User Equipment, UE, and the service node (40) is a Broadcast/Multicast Service Center, BM-SC. In another embodiment, the multimedia broadcast/multicast service is an Open Mobile Alliance Broadcast, OMA BCAST, service, the user terminal (20) is a Terminal, and the service node (40) is an OMA BCAST Subscription Management, BSM, node.

12 Claims, 10 Drawing Sheets

(56) References Cited

U.S. PATENT DOCUMENTS

| | | | |
|---|---|---|---|
| 2006/0153124 A1* | 7/2006 | Kant et al. | 370/328 |
| 2007/0093202 A1* | 4/2007 | Hwang et al. | 455/432.1 |
| 2007/0140112 A1* | 6/2007 | Osterhout et al. | 370/225 |
| 2008/0037468 A1* | 2/2008 | Zisimopoulos et al. | 370/331 |
| 2008/0080366 A1* | 4/2008 | Ebisawa | 370/217 |
| 2009/0052419 A1* | 2/2009 | Ahlstrom et al. | 370/338 |

OTHER PUBLICATIONS

European Telecommunications Standards Institute. ESTI TS 133 246, V7.6.0 (Jan. 2008). Universal Mobile Telecommunications System (UMTS); 3G Security; Security of Multimedia Broadcast/Multicast Service (MBMS) (3GPP TS 33.246 version 7.6.0 Release 7).

Open Mobile Alliance. "Service and Content Protection for Mobile Broadcast Services." Draft Version 1.0, Aug. 29, 2005, Available online at: http://member.openmobilealliance.org/ftp/public_documents/bcast/permanent_documents/oma-ts-bcast_svccntprotection-v1_0-20050829-d.zip.

3GPP, "3rd Generation Partnership Project; Technical Specification Group Services and System Aspects; 3G Security; Security of Multimedia Broadcast/Multicast Service (MBMS); (Release 7)", 3GPP TS 33.246 V7.6.0, pp. 16-25, Dec. 2007, France.

* cited by examiner

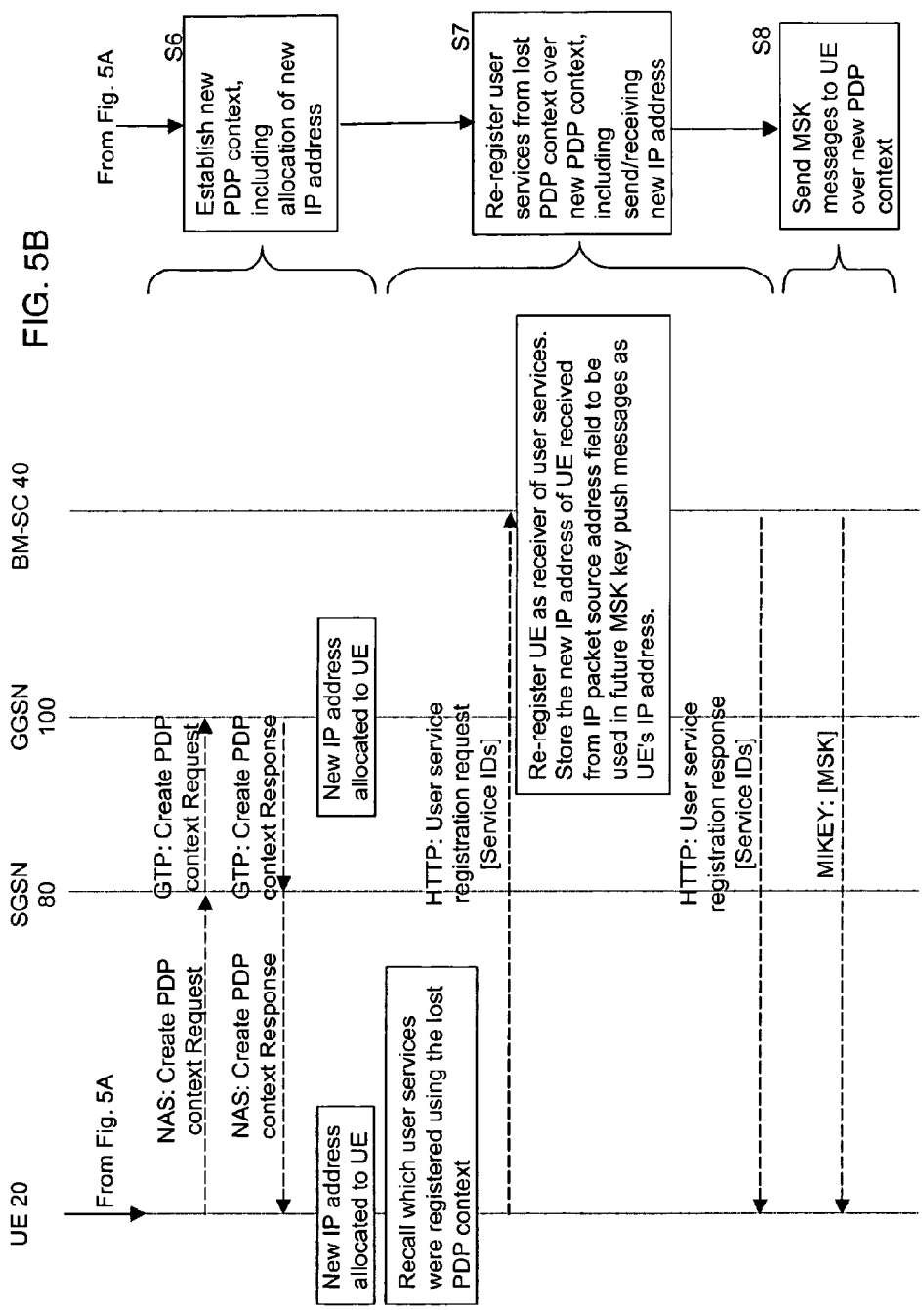

METHOD AND APPARATUS FOR RELIABLE BROADCAST/MULTICAST SERVICE

TECHNICAL FIELD

The present invention relates to a method and apparatus for use in a communications network, particularly where a Multimedia Broadcast/Multicast Service is involved.

BACKGROUND

MBMS (Multimedia Broadcast/Multicast Service) is a feature in 3GPP networks that enables the provision of services through multicast/broadcast transmission over 3G networks. This helps to save network resources when a large number of users are interested in the same service at the same time (for example, as in MobileTV). Saving of resources is achieved because the same multicast/broadcast transmission can be received by several users, and the amount of network resources used is not dependent on the number of receivers, which is the case for unicast services.

Multimedia broadcast/multicast services have become widespread, even more so since mobile handheld devices have become capable of receiving multimedia content via radio networks.

The introduction of the Multimedia Broadcast Multicast Service (MBMS) [3GPP-23246-720-MBMS-architecture, 3GPP-22146-820-MBMS-stage1, 3GPP-25346-730-MBMS-stage2] in the UMTS Terrestrial Radio Access (UTRA) provides techniques for optimized transmission of a MBMS bearer service such as point-to-multipoint transmission, selective combining and transmission mode selection between Point-to-Multipoint (PTM) and Point-to-Point (PTP) bearers. MBMS logical transmission channels are defined and are mapped to physical ones. The basic logical channels are as follows:

(a) MBMS point-to-multipoint Control Channel (MCCH): This logical channel is used for a PTM downlink transmission of control plane information between network and User Equipments (UEs).

(b) MBMS point-to-multipoint Traffic Channel (MTCH): This logical channel is used for a PTM downlink transmission of user plane information between network and UEs.

(c) MBMS point-to-multipoint Scheduling Channel (MSCH): This logical channel is used for a PTM downlink transmission of MBMS service transmission schedule between network and UEs.

As is illustrated schematically in FIG. 1 of the accompanying drawings, the MBMS architecture is divided vertically into two layers according to their functionality: an MBMS bearer service layer 14 and an MBMS user service layer 12. A key node in MBMS is the BM-SC (Broadcast/Multicast Service Center) 4, which transmits MBMS service data towards the UE (User Equipment) 2. The BM-SC 4 is located behind the GGSN (Gateway GPRS Support Node) 10. The UE 2 is in communication with the GGSN 10 via the Radio Access Network (RAN) 6 and the Serving GPRS Support Node (SGSN) 8.

The MBMS user service layer 12 is defined between the BM-SC 4 and the UE 2. MBMS user service (specified in TS 23.346; Multimedia Broadcast/Multicast Service (MBMS); Protocols and codecs consists of the actual content of the MBMS service (e.g. a MobileTV program) and related protocols and codecs and so on.

MBMS security (see TS 33.246; MBMS security; http://www.3gpp.org/ftp/Specs/html-info/33246.htm) is also defined to be at the MBMS user service layer 12. It defines the security functionalities, which can be used to restrict the service only to authorized users.

The MBMS bearer service 14 (see TS 23.246; MBMS bearer service; http://www.3gpp.org/ftp/Specs/html-info/23246.htm) provides the multicast/broadcast transmission infrastructure and resources over which the MBMS user services are transmitted, e.g. the multicast/broadcast distribution tree. In addition to the UE 2 and BM-SC 4, the GGSN 10, SGSN 8 and RAN 6 are part of the MBMS bearer service 14.

The MBMS bearer service 14 is further divided into two modes: multicast mode and broadcast mode. The difference between these two modes is broadly as follows.

Multicast mode services are only transmitted in those areas where interested UEs 2 are present. When a UE 2 wants to receive a MBMS service which is provided using multicast mode, the UE 2 sends an IGMP (Internet Group Management Protocol) join request to the GGSN 10 over the default PDP (Packet Data Protocol) context. This will result in a MBMS UE context being created to each network node on the path between and including the UE 2 and the BM-SC 4, and the multicast distribution tree is updated accordingly (see clause 8.2 of TS 23.246). In short, the network is aware of the UE on MBMS bearer level.

In general, broadcast mode services are transmitted in certain areas regardless of whether or not UEs 2 are present. When a UE 2 wants to receive a MBMS service which is provided using broadcast mode, the UE 2 configures itself locally to receive the transmission and does not contact the network on the bearer level (see clause 8.12 of TS 23.246). In short, the network is not aware of the UE 2 on the MBMS bearer level.

MBMS security is independent of multicast and broadcast modes as it is MBMS user service level 12 functionality. This means that both multicast mode and broadcast mode services can be protected using MBMS security. When a UE 2 wants to receive a protected service, then the UE 2, in addition to bearer level actions described above, registers to the BM-SC 4 on the MBMS user service layer 12 to get the needed MBMS service keys.

In MBMS security, the UE 2 uses a PDP context (PDP context provides IP connectivity for the UE 2) for registering to and de-registering from the MBMS user service. The same PDP context is also used by the BM-SC 4 to push MBMS service key (MSK) update messages to the UE 2. This is possible since the BM-SC 4 stores the IP address of the UE 2 when it receives a registration message from the UE 2 on the PDP context. This is depicted schematically in FIG. 2 of the accompanying drawings.

As appreciated by the present applicant, a situation can arise in which the PDP context is deleted (or replaced by another PDP context) for some reason, and this would mean that the associated IP address of the UE 2 would no longer be valid, as is represented schematically in FIG. 3 of the accompanying drawings.

However, the BM-SC 4 would not know that the IP address is no longer valid, and would continue sending MBMS service key (MSK) messages to the non-existing IP address. The MSK messages would be discarded in the GGSN 10 as the GGSN 10 would not recognize the destination IP address in the message.

Possible reasons for the PDP context being deleted or replace are found in TS 24.008 ch. 6.1.3.4.2: "regular deactivation", "network failure", "Operator Determined Barring", or "reactivation requested". The user might not notice the deletion or replacement as the PDP context is used only for background key management and the actual MBMS content is sent over the MBMS bearers.

As a result, the UE 2 might not receive the MBMS service keys in time, these service keys being required to decrypt the service, or the MBMS service key messages could be sent to the wrong UE 2 if the IP address was quickly allocated to another UE 2 (sending the service keys to the wrong UE would not break MBMS security, since the service keys are encrypted with UE-specific higher layer keys).

The current security specification (TS 33.246) states that the UE 2 may notice from the key identifiers of the received MBMS content that it does not have the correct MSK to decrypt the service. This can trigger the UE 2 to fetch a new MSK from the BM-SC 4. To do this, the UE 2 would have to set up a new PDP context if the UE 2 does not have any active PDP contexts. The problem with this mechanism is that the UE 2 may already have received some real-time content encrypted with the missing MSK. This would mean that there is a service interruption (e.g. in mobile TV program) until the UE 2 has fetched and installed the correct MSK.

Currently, the loss of the PDP context has been addressed differently for multicast mode and broadcast modes.

The current approach for the multicast mode will first be described. In this scenario, as defined in TS 23.246 clause 6.1, the UE 2, SGSN 8, GGSN 10 and BM-SC 4 have stored the UE specific MBMS UE context needed to establish the multicast distribution tree. This MBMS UE context is set up with the MBMS bearer level activation procedure.

In addition, the UE 2 and SGSN 8 have stored the association between the PDP context (so called linked NSAPI or Network layer Service Access Point Identifier) and the MBMS UE context, as illustrated schematically in FIG. 4 of the accompanying drawings.

If the PDP context is deleted by the UE 2, SGSN 8 or GGSN 10, then the SGSN 8 will start a multicast service deactivation procedure to delete the MBMS UE context in all nodes (see clause 8.7 of TS 23.246).

This multicast service deactivation procedure will also reach the BM-SC 4, which will then know that the MBMS bearer service (and MBMS UE context) has been deactivated for this UE 2 and the BM-SC 4 will then assume that the MBMS user service related to the deactivated MBMS bearer service is also deactivated for this UE 2. The BM-SC 4 then knows that it should no longer send MBMS service key update messages to the UE 2.

The multicast service deactivation procedure will also reach the UE 2 and the user would likely notice that the MBMS service went down. This would of course mean service interruption. The user might then re-initiate the MBMS user service (which would then mean activating a new PDP context and activating MBMS bearer service again).

Turning now to the current approach for the broadcast mode, the issue for the broadcast mode is different as the network is not aware of the UE 2 at the MBMS bearer level, since there are no UE specific MBMS UE contexts stored in the SGSN 8, GGSN 10 or BM-SC 4. Therefore the network does not know that a certain PDP context is used for MBMS key management. Two different cases need to be considered: (a) UE-initiated PDP context deletion; and (b) network-initiated PDP context deletion.

The UE-initiated PDP context deletion case is already covered in clause 6.3.2.1A of TS 33.246, which states that the UE 2 shall not delete the PDP context (used for key management) until the UE 2 has de-registered from the MBMS user service. It has also been stated in 6.3.1 of TS 33.246 that the PDP context should be of interactive or background QoS (Quality of Service) class, which are known to be long-lived. (It is still to be decided if the PDP context could still be deleted by accident, e.g. by user actions.)

However, the network-initiated PDP context deletion is not covered in the current specifications. Although the PDP context could be long-lived, it may still be possible that the PDP context is deleted by the network, i.e. SGSN 8 or GGSN 10 for some reason, e.g. network failure. In this case, the BM-SC 4 will not be aware of that the UE IP address is no longer valid and it would continue sending MBMS service key (MSK) messages to a non-existing IP address, as is represented in FIG. 3 and described above. This is a problem because, in the broadcast mode, the intermediate nodes (i.e. the SGSN 8 and GGSN 10) are not aware that the deleted PDP context was used for MBMS, so they cannot indicate this to BM-SC 4 either. As a consequence, the UE 2 would not receive the required keys in time and the service would be interrupted for the UE 2 as it cannot decrypt the MBMS user service.

It is desirable to address this issue.

WO 99/48246 discloses a scheme for re-establishing a lost multicast connection between an end user and a group in a multicast environment.

SUMMARY

According to a first aspect of the present invention there is provided a method for use by a user terminal operating an IP-based multimedia broadcast/multicast service, the method comprising: establishing an IP-based connection for registering to the broadcast/multicast service and for security key management between the user terminal and a service node for the broadcast/multicast service; storing information relating to user service registrations performed using the IP-based connection; and following loss of the IP-based connection; establishing a new IP-based connection, or selecting another active IP-based connection, to replace the lost IP-based connection; and using the stored information to re-register at least some of any of the user services affected by the loss, the re-registration being performed using the replacement IP-based connection.

The IP connection may comprise a Packet Data Protocol, PDP, context.

The multimedia broadcast/multicast service may be a 3GPP Multimedia Broadcast/Multicast Service, MBMS, the user terminal is a User Equipment, UE, and the service node is a Broadcast/Multicast Service Center, BM-SC.

The IP-based connection may be established between the user terminal and a Gateway General Packet Radio Service Support Node, GGSN, via a Serving General Packet Radio Service Support Node, SGSN.

The multimedia broadcast/multicast service may be an Open Mobile Alliance Broadcast, OMA BCAST, service, the user terminal is a Terminal, and the service node is an OMA BCAST Subscription Management, BSM, node.

A user terminal is to be interpreted as covering any type of device that is capable of providing a broadcast/multicast service to a user of the device in communication with a service node of a broadcast/multicast service. This includes at least a MBMS UE and an OMA BOAST Terminal.

The method may comprise sending a new IP address for the user terminal to the service node, for use by the service node in sending key messages to the user terminal over the replacement IP-based connection. A key message may be a message carrying a cryptographic or other type of security key.

The key messages may be MBMS service key, MSK, messages.

The key messages may be OMA BOAST Long-Term Key Messages, LTKMs.

The method may comprise monitoring for loss of the IP-based connection.

The method may comprise performing the method in relation to each of a plurality of such IP-based connections.

The loss of IP-based connection may be caused by network malfunction, or for other reasons.

According to a second aspect of the present invention there is provided an apparatus for use as or in a user terminal in an IP-based multimedia broadcast/multicast service, comprising: a portion arranged to establish an IP-based connection for registering to the broadcast/multicast service and for security key management between the user terminal and a service node for the broadcast/multicast service; storage arrange to store information relating to user service registrations performed using the IP-based connection; and a portion arrange to, following loss of the IP-based connection establish a new IP-connection, or select another active IP-based connection, to replace the loste IP-based connection; and use the stored information to re-register at least some of any of the user services affected by the loss, the re-registration being performed using the replacement IP-based connection.

According to a second aspect of the present invention there is provided an apparatus for use as or in a user terminal in an IP-based multimedia broadcast/multicast service, comprising: a portion arranged to establish an IP-based connection for registering to the broadcast/multicast service and for security key management between the user terminal and a service node for the broadcast/multicast service; storage arrange to store information relating to user service registrations performed using the IP-based connection; and a portion arrange to, following loss of the IP-based connection establish a new IP-connection, or select another active IP-based connection, to replace the loste IP-based connection; and use the stored information to re-register at least some of any of the user services affected by the loss, the re-registration being performed using the replacement IP-based connection.

According to a fourth aspect of the present invention there is provided an apparatus programmed by a program according to the third aspect of the present invention.

According to a fifth aspect of the present invention there is provided a storage medium containing a program according to the third aspect of the present invention.

An embodiment of the present invention has at least one of the following advantages:

It ensures continuation of the protected MBMS user service in a situation where the PDP context used for key management is suddenly deleted It avoids the BM-SC sending key management messages to a non-existent IP address Although the problem addressed by an embodiment of the present invention is a little different in multicast mode (where the BM-SC will notice that the PDP context has been lost and it may stop also sending the MSK messages), and broadcast mode (where the BM-SC would not notice the lost PDP context, would try to send MSK messages unnecessarily), a solution according to an embodiment of the present invention can work for both multicast and broadcast modes since the effect of an embodiment of the present invention is the rapid reaction to a lost PDP context.

BRIEF DESCRIPTION OF THE DRAWINGS

FIGS. 5A and 5B contain a flowchart illustrating steps performed in an MBMS embodiment of the present invention;

DETAILED DESCRIPTION

Figure 1:
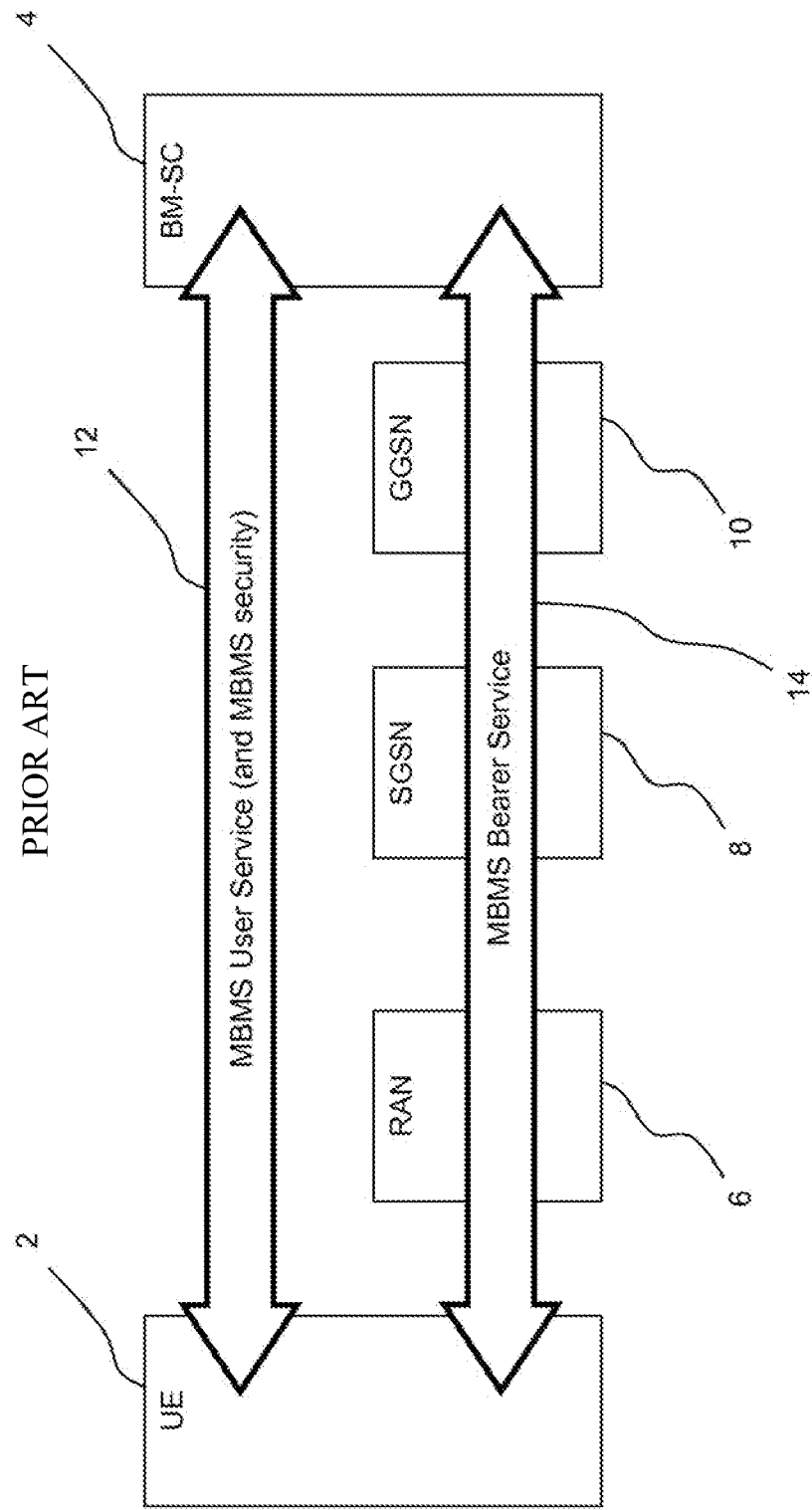
FIG. 1, discussed hereinbefore, illustrates schematically the MBMS user service and MBMS bearer service.
Figure 2:
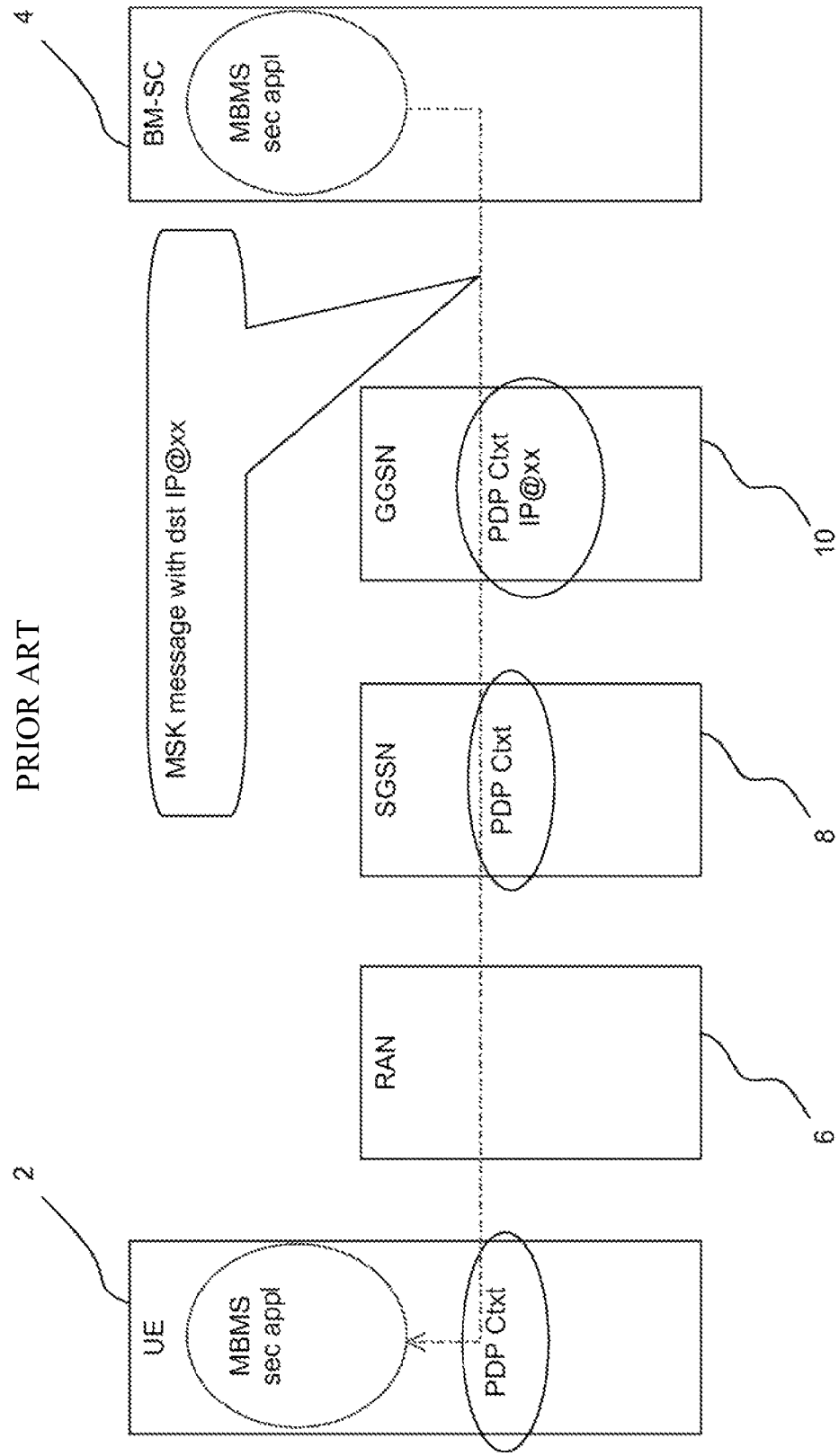
FIG. 2, also discussed hereinbefore, illustrates schematically the sending of MSK messages over a PDP context.
Figure 3:
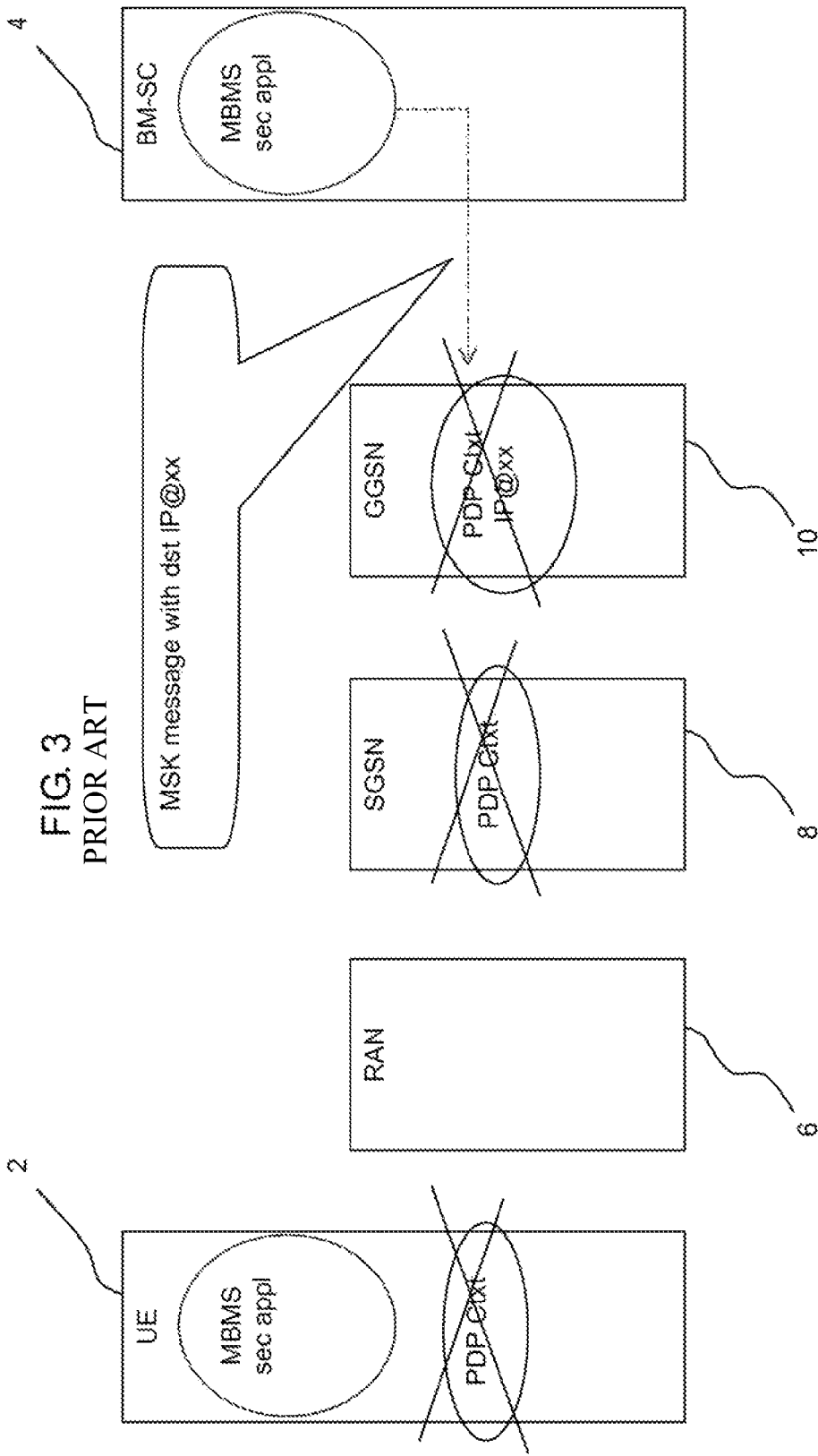
FIG. 3, also discussed hereinbefore, illustrates schematically how the PDP context is deleted and the MSK messages no longer reach the UE.
Figure 4:
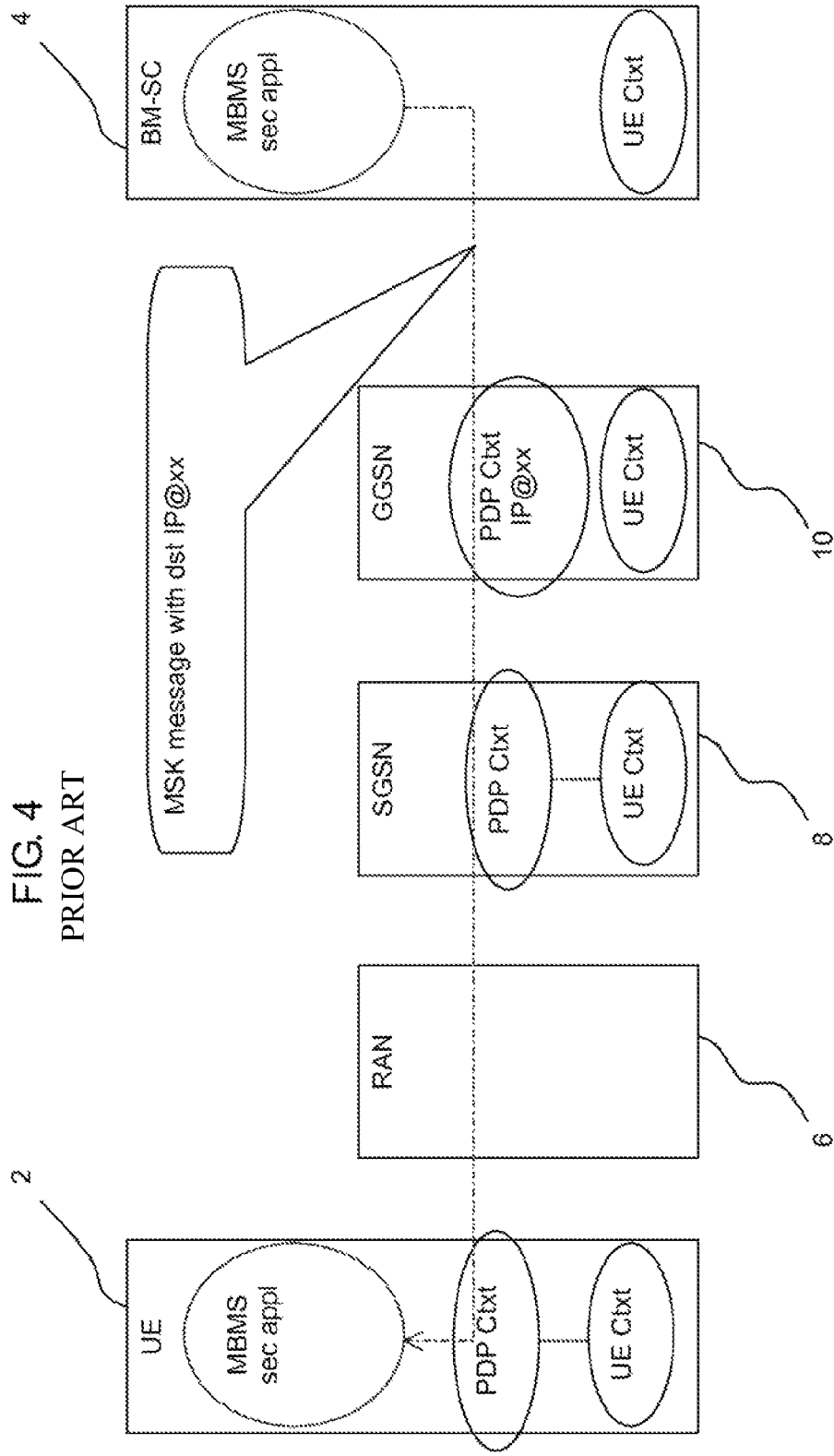
FIG. 4, also discussed hereinbefore, illustrates schematically the relation of PDP context and MBMS UE contexts in the MBMS multicast mode.
Figure 5A:
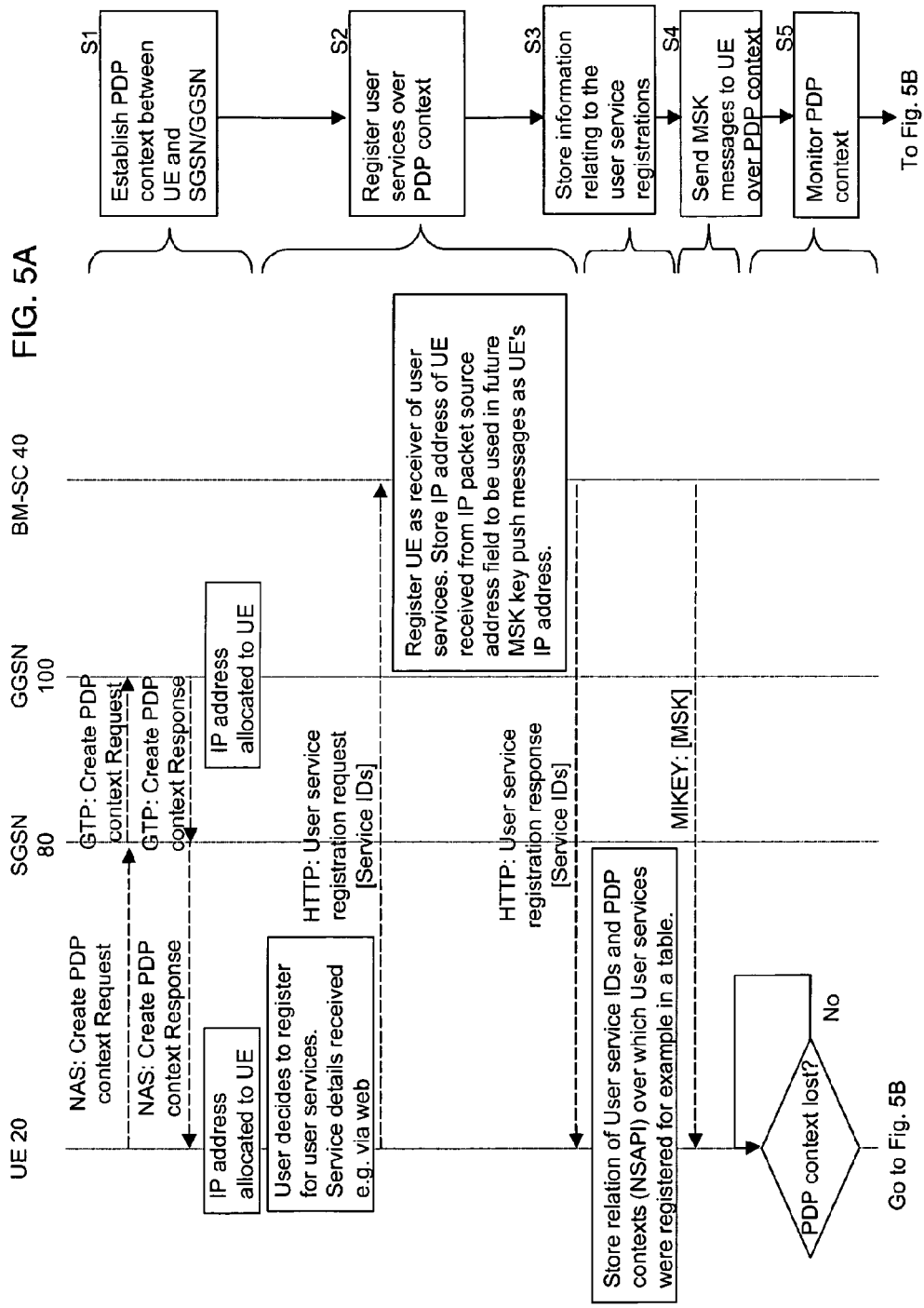
Figure 6:
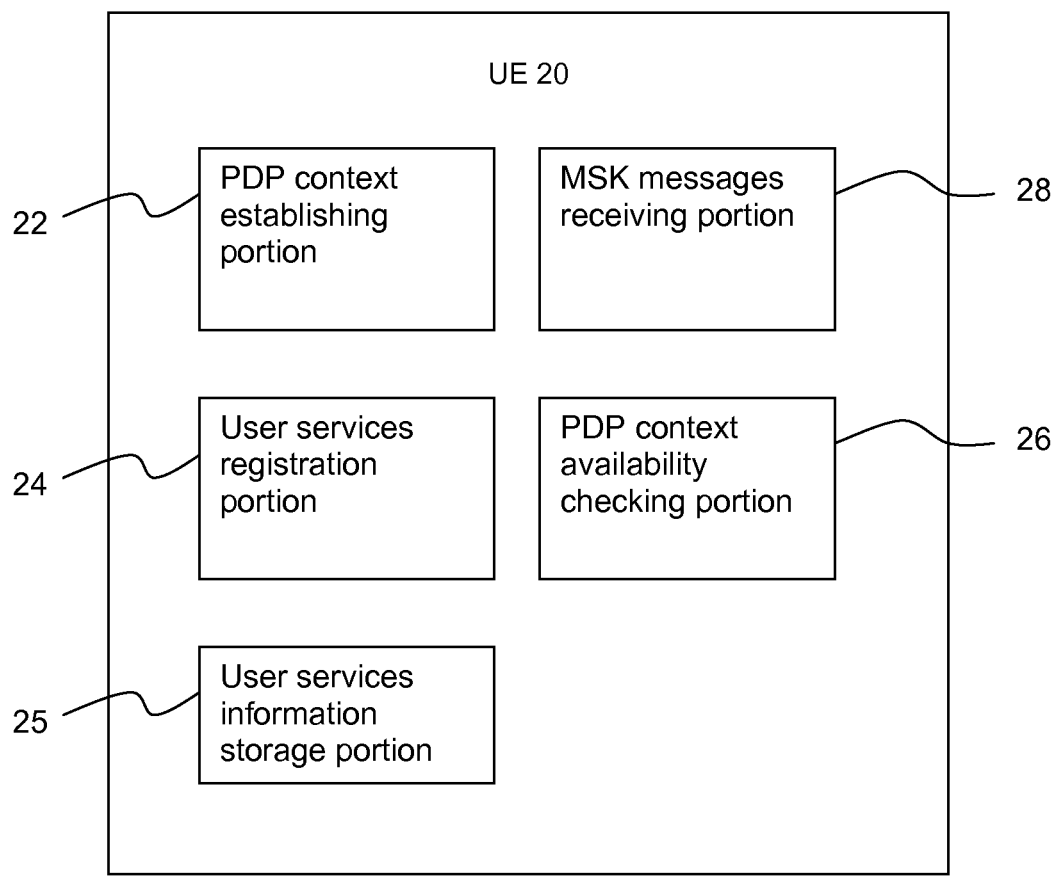
FIG. 6 illustrates schematically parts of a User Equipment embodying the present invention for performing the steps of FIGS. 5A and 5B.
Figure 7:
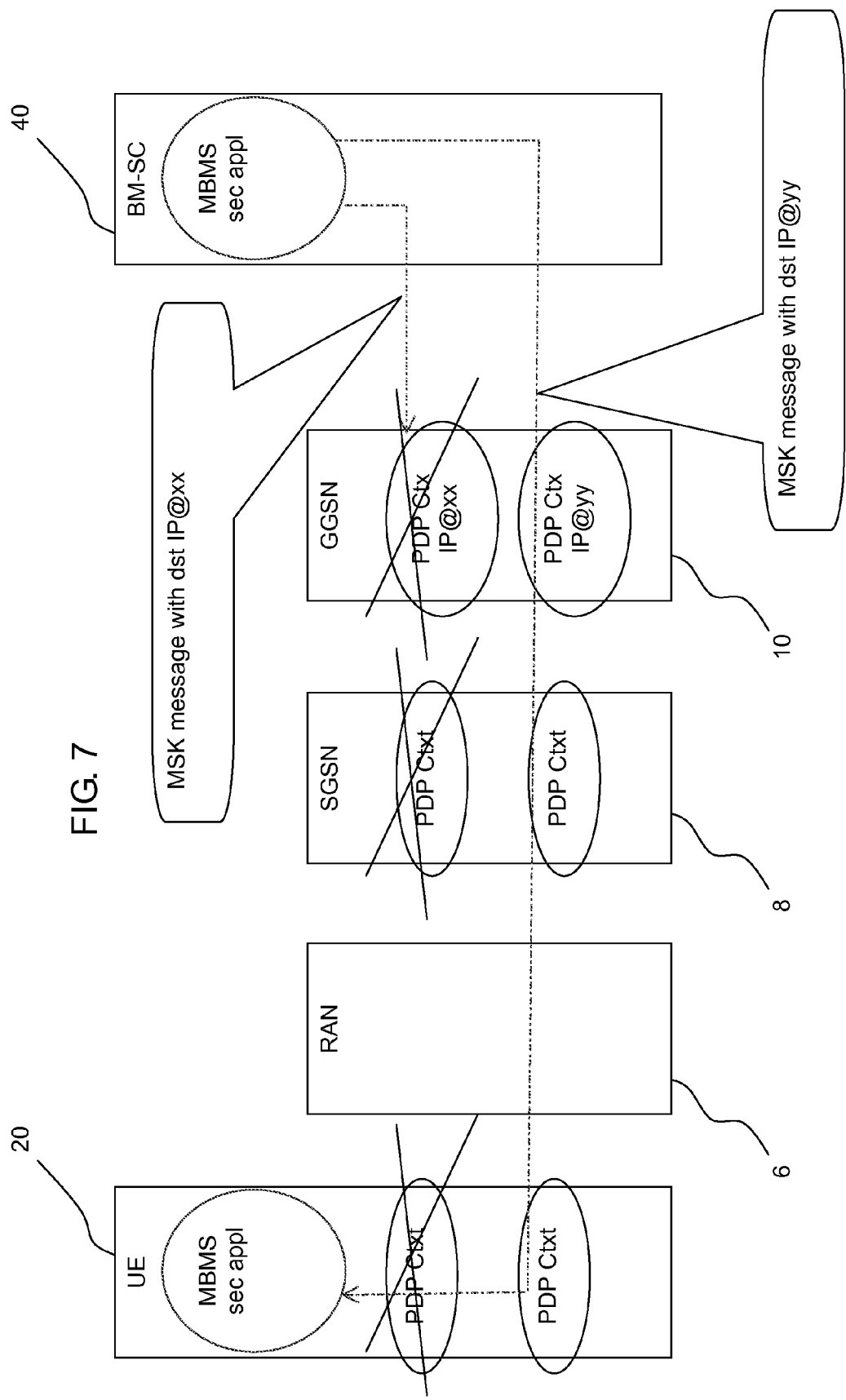
FIG. 7 is a schematic illustration of how the BM-SC uses a new PDP context in an embodiment of the present invention to send MSK messages.

An embodiment of the present invention will now be described with reference to FIGS. 5A, 5B, 6 and 7. FIGS. 5A and 5B contain a flowchart illustrating steps performed in an embodiment of the present invention by a UE 20, a SGSN 80, a GGSN 100, and a BM-SC 40, while FIG. 6 illustrates schematically parts of the UE 20 for performing the steps of FIGS. 5A and 5B.

In step S1, a PDP context is established to enable connectivity between the UE 20 and the BM-SC 40; for this purpose the UE 20 uses a PDP context establishing portion 22 for establishing the PDP context. The PDP context is established between the UE 20 and the GGSN 100, thereby enabling connectivity over the PDP context between the UE 20 and the BM-SC 40. During the performance of step S1, an IP address is allocated to the UE 20.

In step S2, the user decides to register for various user services, and in response the UE 20 performs various MBMS user service registrations over the PDP context, using the user services registration portion 24 for registering user services; these user service registrations would usually take place over a period of time. In the BM-SC 40, the UE 20 is registered as the receiver of these user services, and the IP address of the UE 20 is retrieved from the IP packet source address and stored for future MSK key push messages. In this regard, the PDP context is also used by the BM-SC 40 to push MSK messages towards the UE 20, as is defined at 6.3.2.1A of TS 33.246, and as is represented by step S4 of FIG. 5A.

The UE 20 keeps track of the PDP context and MBMS user service registrations that have been performed using that PDP context in step S2, storing this information in step S3 in user services information storage portion 25 (or alternatively at a remote storage location accessible by the UE 20). This information represents a relationship between the user service IDs and the PDP contexts (NSAPI) over which the user services were registered, for example in a table form.

In step S5, the UE 20 uses a PDP context availability checking portion 26 to check or monitor the availability of the PDP context for which information is stored in the storage portion 25. If the UE 20 determines that the PDP context is still available, it continues to perform the check of step S5. This check can be performed in various ways; for example the check can be performed at regular intervals, or the UE 20 may wait for a message which indicates that the PDP context is no longer available. The UE 20 can discover network-initiated PDP context deletion as described in 9.2.4.2 and 9.2.4.3 in TS 23.060 (General Packet Radio Service (GPRS); Service description http://www.3gpp.org/ftp/Specs/html-info/23060.htm).

If the UE 20 does notice that the PDP context has been lost, in step S6 the UE 20 establishes and activates a new PDP context, using the establishing portion 22; during this process a new IP address is allocated to the UE 20. Then, in step S7, the UE 20 performs re-registration for all (or a subset of) affected MBMS user services using the new PDP context established in step S6, using the registration portion 24. (In the case of the MBMS multicast mode, this would also result in activation of MBMS bearer service for the user, but this is transparent to the security solution.)

Step S7 also provides the BM-SC 40 with the new IP address of the UE 20, which allows the BM-SC 40 to continue sending MBMS service key (MSK) messages to the UE 20 with the new IP address relating to the new PDP context, as is shown by step S8 and performed in the UE by receiving portion 28 for receiving MSK messages. In this way, the UE 20 is able to enjoy the MBMS user service without interruption in key management.

As an alternative, rather than activating a new PDP context, if there are other active PDP contexts available then the UE 20 could arrange for one of those PDP contexts to be used instead.

An embodiment of the present invention applies to both broadcast and multicast modes; the previously-proposed mechanism for multicast mode only provides for the notification of the BM-SC of the PDP context deactivation.

The above embodiment has been described in the context of MBMS, but it will be appreciated that the same concept can be applied in other comparable contexts. For example, an embodiment of the present invention is also possible in the Open Mobile Alliance (OMA) Mobile Broadcast (BOAST) scenario; OMA BOAST is a specification for mobile TV and on-demand video services.

Figure 8A:
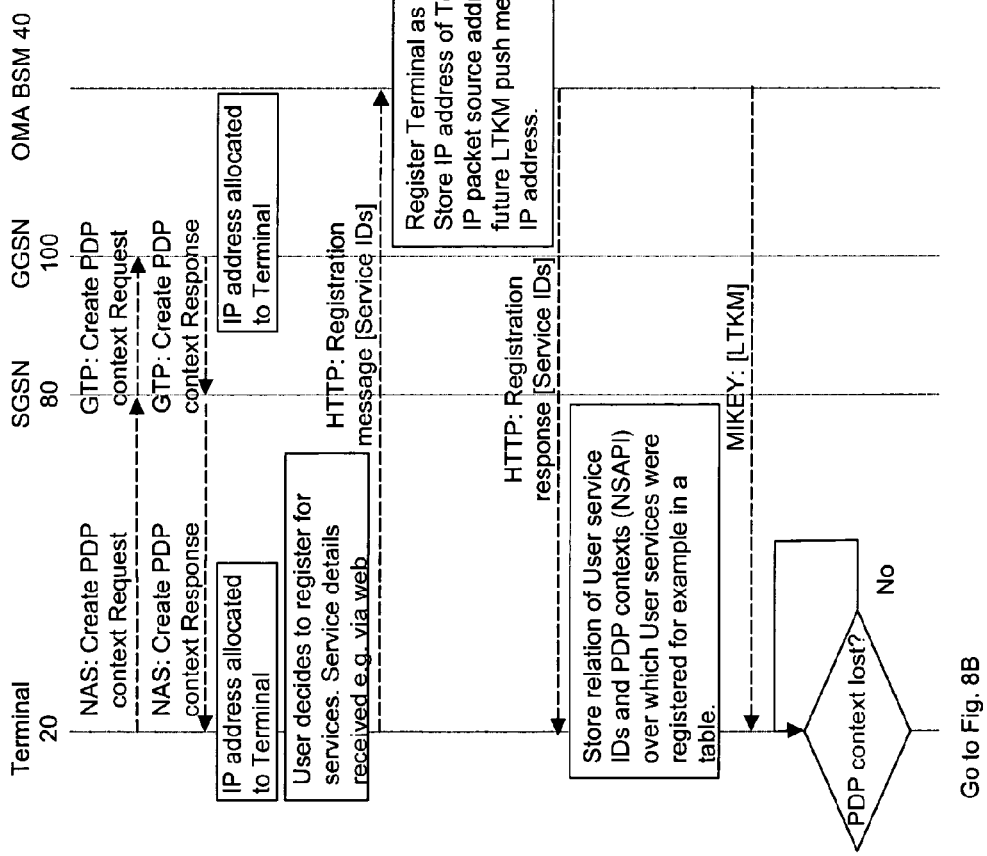
FIGS. 8A and 8B contain a flowchart illustrating steps performed in an OMA BOAST embodiment of the present invention.
Figure 8B:
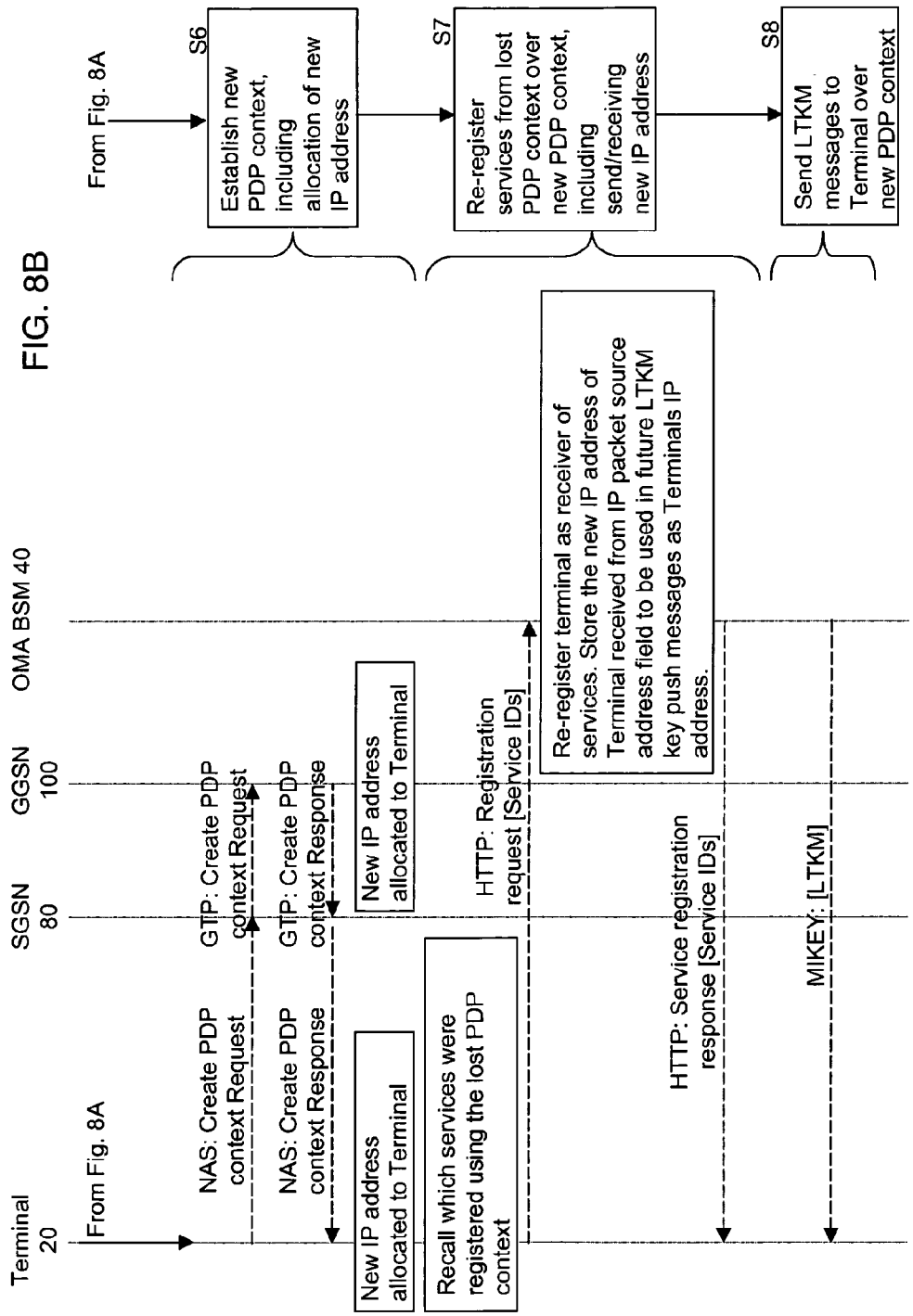

The above-described embodiment relating to MBMS can readily be adapted to provide a corresponding solution in the context of OMA BOAST, and FIGS. 8A and 8B illustrate operation of an OMA BOAST alternative embodiment of the present invention. It will be apparent that the OMA procedure is entirely equivalent to the MBMS procedure, with only the names of messages and nodes being different. The OMA BOAST embodiment therefore requires no detailed explanation, it merely being necessary to note that the differences are as follows: the UE of MBMS is called a Terminal in OMA BOAST, the BM-SC of MBMS is called an OMA BSM (BOAST Subscription Management) in OMA BOAST, the MSK message of MBMS is called an LTKM (Long-Term Key Message) in OMA BOAST, and the User service registration request of MBMS is called a Registration request in OMA BOAST.

With these differences in mind, the skilled person would readily be able to realise an OMA BOAST embodiment based on the above description relating to MBMS. OMA uses the same PDP context connection as MBMS as underlying IP connection, i.e. the same references to those specifications apply. The OMA specific details of Registration and key management are described in the following specification documents: "Mobile Broadcast Services" OMA-TS-BCAST_Services-V1_0-20080103-D; and "Service and Content Protection for Mobile Broadcast Services" OMA-TS-BCAST_SvcCntProtection-V1_0-20071218-D, which are available from www.openmobilealliance.org.

It will be appreciated that operation of one or more of the above-described components can be controlled by a program operating on the device or apparatus. Such an operating program can be stored on a computer-readable medium (e.g., in memory for execution by one or more processing circuits).

Although the present invention has been described above with reference to specific embodiments, those skilled in the art would understand that various changes, substitutions and alterations can be made without departing from the scope of the invention as defined by the appended claims.

For example, the skilled person would readily appreciate that broadcast/multicast services are applicable to fixed networks just as they are to mobile networks, and that the present invention can easily be applied in such a scenario. In a fixed network, the IP connection may not always be a PDP context, as described above in relation to MBMS and OMA BOAST. The present invention is applicable in the general case where a user terminal (whether a MBMS UE or an OMA BOAST Terminal or some other type of terminal operated by a user) is operating an IP-based multimedia broadcast/multicast service (whether a MBMS service or an OMA BOAST service or some other such service) in any type of network (whether mobile or fixed). The underlying method comprises storing information relating to user service registrations performed using an IP connection of some sort (whether a PDP context or otherwise) established to enable connectivity between the user terminal and a service node (whether a MBMS BM-SC node or an OMA BSM node or some other corresponding node) for the broadcast/multicast service. The information is of a type to enable re-registration of at least some of any of the user services affected by a loss of the IP connection.

The invention claimed is:

1. A method for use by a user terminal in an IP-based multimedia broadcast/multicast service, the method comprising:
    establishing an IP-based connection for registering to the broadcast/multicast service and for security key management between the user terminal and a service node for the broadcast/multicast service;
    storing information relating to user service registrations performed using the IP-based connection; and
    following loss of the IP-based connection:
        establishing a new IP-based connection from the user terminal to the service node, or selecting another active IP-based connection from the user terminal to the service node, to replace the lost IP-based connection; and
        using the stored information to re-register at least some of any of the user services affected by the loss, the re-registration being performed using the replacement IP-based connection.

2. The method of claim 1, wherein the IP-based connection comprises a Packet Data Protocol (PDP) context.

3. The method of claim 1, wherein the multimedia broadcast/multicast service is a 3GPP Multimedia Broadcast/Multicast Service (MBMS), the user terminal is a User Equipment (UE), and the service node is a Broadcast/Multicast Service Center (BM-SC).

4. The method of claim 3, wherein the IP-based connection is established between the user terminal and a Gateway General Packet Radio Service Support Node (GGSN) via a Serving General Packet Radio Service Support Node (SGSN).

5. The method of claim 1, wherein the multimedia broadcast/multicast service is an Open Mobile Alliance Broadcast (OMA BOAST) service, the user terminal is a Terminal, and the service node is an OMA BOAST Subscription Management (BSM) node.

6. The method of claim 1, comprising sending a new IP address for the user terminal to the service node, for use by the service node in sending key messages to the user terminal over the replacement IP-based connection.

7. The method of claim 6, wherein the multimedia broadcast/multicast service is a 3GPP Multimedia Broadcast/Multicast Service (MBMS), the user terminal is a User Equipment (UE), and the service node is a Broadcast/Multicast Service Center (BM-SC), and further wherein the key messages are MBMS service key (MSK) messages.

8. The method of claim 6, wherein the multimedia broadcast/multicast service is an Open Mobile Alliance Broadcast (OMA BOAST) service, the user terminal is a Terminal, and the service node is an OMA BOAST Subscription Management (BSM) node, and further wherein the key messages are OMA BOAST Long-Term Key Messages (LTKMs).

9. The method of claim 1, further comprising monitoring for loss of the IP-based connection.

10. The method of claim 1, further comprising performing the method in relation to each of a plurality of such IP-based connections.

11. The method of claim 1, where the loss of the IP-based connection is caused by a network malfunction.

12. Apparatus for use as or in a user terminal in an IP-based multimedia broadcast/multicast service, said apparatus comprising one or more processing circuits and associated memory, said one or more processing circuits configured to:
- establish an IP-based connection for registering to the broadcast/multicast service and for security key management between the user terminal and a service node for the broadcast/multicast service;
- store information relating to user service registrations performed using the IP-based connection; and
- following loss of the IP-based connection:
- establish a new IP-based connection from the user terminal to the service node, or select another active IP-based connection from the user terminal to the service node, to replace the lost IP-based connection; and
- use the stored information to re-register at least some of any of the user services affected by the loss, the re-registration being performed using the replacement IP-based connection.

* * * * *

UNITED STATES PATENT AND TRADEMARK OFFICE
CERTIFICATE OF CORRECTION

PATENT NO. : 8,611,210 B2
APPLICATION NO. : 12/919415
DATED : December 17, 2013
INVENTOR(S) : Lehtovirta Page 1 of 2

It is certified that error appears in the above-identified patent and that said Letters Patent is hereby corrected as shown below:

In the Specification

In Column 1, Line 63, delete "codecs" and insert -- codecs) --, therefor.

In Column 4, Line 58, delete "BOAST" and insert -- BCAST --, therefor.

In Column 4, Line 66, delete "BOAST" and insert -- BCAST --, therefor.

In Column 5, Lines 23-37, delete "According to a second aspect............ IP-based connection.".

In Column 6, Line 18, delete "BOAST" and insert -- BCAST --, therefor.

In Column 7, Line 34, delete "(BOAST)" and insert -- (BCAST) --, therefor.

In Column 7, Line 35, delete "BOAST" and insert -- BCAST --, therefor.

In Column 7, Line 39, delete "BOAST," and insert -- BCAST, --, therefor.

In Column 7, Line 40, delete "BOAST" and insert -- BCAST --, therefor.

In Column 7, Line 44, delete "BOAST" and insert -- BCAST --, therefor.

In Column 7, Line 47, delete "BOAST," and insert -- BCAST, --, therefor.

In Column 7, Line 48, delete "(BOAST" and insert -- (BCAST --, therefor.

In Column 7, Line 48, delete "BOAST," and insert -- BCAST, --, therefor.

In Column 7, Line 50, delete "BOAST," and insert -- BCAST, --, therefor.

In Column 7, Line 52, delete "BOAST." and insert -- BCAST. --, therefor.

In Column 7, Line 54, delete "BOAST" and insert -- BCAST --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,611,210 B2

In Column 8, Line 13, delete "BOAST." and insert -- BCAST. --, therefor.

In Column 8, Line 15, delete "BOAST" and insert -- BCAST --, therefor.

In Column 8, Line 18, delete "BOAST" and insert -- BCAST --, therefor.

In the Claims

In Column 8, Line 63, in Claim 5, delete "BOAST)" and insert -- BCAST) --, therefor.

in Column 8, Line 64, in Claim 5, delete "BOAST" and insert -- BCAST --, therefor.

In Column 9, Line 11, in Claim 8, delete "BOAST)" and insert -- BCAST) --, therefor.

In Column 9, Line 12, in Claim 8, delete "BOAST" and insert -- BCAST --, therefor.

In Column 9, Line 14, in Claim 8, delete "BOAST" and insert -- BCAST --, therefor.